3,210,169
HYDROCARBON COMPOSITIONS CONTAINING SALTS OF CERTAIN NITROGEN-CONTAINING POLYMERS WITH SULFODICARBOXYLATES
Johan L. van der Minne, Pieter H. J. Hermanie, and Cornelis Douwes, all of Amsterdam, Netherlands, assignors to Shell Oil Company, New York, N.Y., a corporation of Delaware
No Drawing. Filed Aug. 10, 1961, Ser. No. 130,469
Claims priority, application Netherlands, Dec. 30, 1960, 259,625
9 Claims. (Cl. 44—62)

The invention relates to novel salts of certain nitrogen-containing polymers. The invention also relates to hydrocarbon compositions with increased electrical conductivity obtained by addition of the above-mentioned metal salts.

Liquid hydrocarbons and hydrocarbon mixtures such as petroleum fractions have a very low electrical conductivity. Consequently the liquid may become electrostatically charged when it moves relative to a surface or interface. Movement relative to a surface occurs, for example, when the liquid is pumped through pipes or through a hose or used for cleaning textile materials. Movement relative to an interface occurs, for example, when suspended water drops settle in the hydrocarbon liquid. The electrostatic charges may give rise to sparks and so cause ignition or explosion of mixture of air and hydrocarbon.

Electrostatic charging occurs to a high degree when hydrocarbons are pumped at high speeds, as for example, in the fueling of aircraft when the fuels pass a filter and are generally pumped through relatively narrow pipes and hoses and high linear speeds are used. In this case there is a considerable explosion hazard. However, there is also some risk when hydrocarbons are pumped at lower speeds as, for example, when storage tanks are filled in refineries, and this risk is greatly increased in the presence of water.

To prevent the formation of electrostatic charges in hydrocarbons having a dielectric constant of 8 or less, for example, hydrocarbons, it is known to add a salt of a polyvalent metal an an alkyl salicylic acid containing at least 1 alkyl substituent having 8 or more carbon atoms. Such a salt can be used separately or in combination with other compounds which increase electrical conductivity. The latter compounds may be of the type which, together with the salt of the polyvalent metal, increases the electrical conductivity of hydrocarbons to a value greater than the sum of the electrical conductivities obtained by employing the two additives separately.

With comparable hydrocarbons the conductivity in the presence of the above salts is inversely proportional to the viscosity of the organic liquids. A comparison between the conductivity of a kerosene and that of a purified gasoline both containing the same conductivity-increasing salts showed that, whether or not the kerosene had been freshly prepared, the conductivity of the kerosene was lower than would have been expected from the viscosity of the kerosene. Further tests showed that when a kerosene is percolated over silica gel, cracking catalyst or alumina the electrical conductivity is increased to a value corresponding to the viscosity of this kerosene. It was also found that the conductivity of a gasoline freshly supplied from a refinery also increased when this gasoline was so treated. The cause of the above phenomenon is not known.

It has been found that when certain organic nitrogen compounds are employed, the above treatment of organic liquids with silica gel for increasing the electrical conductivity may be omitted.

It is an object of the present invention to provide improved hydrocarbon compositions. It is another object of the invention to provide hydrocarbon compositions showing increased electrical conductivity. It is a further object of the invention to provide novel nitrogen containing polymers. Other objects will become apparent during the following description of the invention.

Now, in accordance with the invention, novel polymers have been found comprising salts of diesters of a $C_{6-18}$ aliphatic monohydric alcohol and a $C_{4-10}$ aliphatic sulphodicarboxylic acid with a basic nitrogen-containing polymer of the group consisting of polymerization $C_{2-5}$ alkylene imines, polymerized vinyl pyridines, polymerized esters of aliphatic amino alcohols with acrylic acids and copolymers of vinyl pyridines with an acrylic acid ester of at least one $C_{10-24}$ alphatic monohydric alcohol, at least 50% of the basic nitrogen radicals of the polymer being in a salt form with the ester of the sulphodicarboxylic acid.

Still in accordance with the present invention, conductivity compositions are provided comprising 1–10 parts by weight each of a salt of a polyvalent metal having an atomic number of 22–28 and a $C_{8-24}$ alkyl salicylic acid together with a salt of the nitrogen containing copolymers as described above.

Again, in accordance with the present invention, hydrocarbon compositions are provided comprising a predominating proportion of essentially saturated hydrocarbons boiling in a range of gasoline and kerosene modified by 0.25–5 p.p.m. of the conductivity composition just described. Further improvements in the conductivity composition and in the hydrocarbon compositions are provided by the additional presence of an alkaline earth metal salt of diesters of $C_{6-18}$ aliphatic alcohols with $C_{4-10}$ sulphodicarboxylic acids.

It has been found that the presence of the salts of the nitrogen-containing polymers cause an unexpected increase in the conductivity and stability of conductivity of hydrocarbon compositions comparable to the extent of the improvement obtained by purification of the hydrocarbons with silica gel or other absorbents.

The nitrogen-containing salts may be derived from polymerization products of alkylene imines. These polymerization products may have branched or straight chains. Such polymers are commercially available, usually as aqueous solutions.

Other examples of polymers include polymers of vinyl pyridines and derivatives thereof, particularly alkyl vinyl pyridines, e.g., 2-methyl-5-vinyl pyridine, and polymers of esters of acids of the acrylic acid series and amino aliphatic monohydric alcohols such as polymers of beta diethyl aminoethyl methacrylate. A vinyl pyridine content in the copolymer of 20–30% by weight is preferred.

Other suitable vinyl pyridines include the following:

2-ethyl-5-vinyl pyridine
2,4-dimethyl-6-vinyl pyridine
2-butyl-5-vinyl pyridine
2,6-dimethyl-5-vinyl pyridine
3-propyl-5-vinyl pyridine
2-, 3-, and 4-vinyl pyridines Other suitable amino alcohol esters include the following:

Beta-dimethyl aminoethyl methacrylate
Gamma-diethyl aminopropyl methacrylate
Beta (methyl) (ethyl) aminoethyl methacrylate
Beta propyl aminopropyl methacrylate
Gamma methyl aminobutyl methacrylate It is also possible to use salts of copolymers of a vinyl pyridine and at least one ester of an acrylic acid and an aliphatic alcohol which may have a chain, of at least 10 carbon atoms such as a copolymer of 2-methyl-5-vinyl pyridine and stearyl methacrylate or a copolymer of 2-methyl-5-vinyl pyridine and a mixture of methyl methacrylate, lauryl methacrylate and stearyl methacrylate.

Specific copolymers of methacrylates and vinyl pyridines include the following:

| Molar Proportions a | | |
|---|---|---|
| LMA | SMA | MVP |
| 1 | 0 | 1.53 |
| 0.9 | 0.4 | 1 |
| 2.4 | 1.2 | 1 |
| 3 | 0 | 1 |
| 0 | 1.35 | 1 |
| 4.5 | 2.1 | 1 | a LMA=lauryl methacrylate; SMA=stearyl methacrylate; MVP= 2-methyl-5-vinyl pyridine.

The nitrogen-containing salts according to the invention may be derived from the above polymers and copolymers as such or from compounds obtained by treating the polymers and copolymers with a hydrocarbon halide, e.g., benzylchloride.

The salts derived from the polymers described hereinbefore normally have average molecular weights between about 2000 and 250,000 but in some instances (e.g., polyalkylene imines) may be substantially higher, even in the order of 10,000,000. It is preferred, however, that the average molecular weight of the additives be within the range of 15,000–250,000 since within this range suitable compatibility with hydrocarbon fuels is achieved. The weight proportions of the metallic salts present in the hydrocarbon composition is preferably between one and ten parts of metallic salt per part by weight of the copolymer salts. Consequently, the proportions of metallic salt expressed in parts by weight based on the hydrocarbon compositions will normally be between about 0.00001 and 0.005%, the combination of metallic salts and polymeric salts preferably being present in a total of about 0.25–10 p.p.m. based on the hydrocarbon composition.

Examples of sulphodicarboxylic acids having 4–10 carbon atoms each from which the esters are formed are sulphosuccinic acid, sulphoglutaric acid and sulphosebacic acid. Alpha-sulphodicarboxylic acids are preferably used. The nitrogen-containing salts are preferably derived from the dicarboxylic esters of these sulphodicarboxylic acids, particularly from sulphodicarboxylic acid esters of aliphatic monohydric alcohols having at least 6–18 carbon atoms, for example cetyl alcohol and decyl alcohol.

Suitable diesters include:

Dioctyl sulfosuccinate
Didecyl sulfosuccinate
Didodecyl sulfosuccinate
Didecyl sulfoadipate
Dioctyl sulfosebacate It is preferred to use salts of polymers having a nitrogen content of at least 0.1% by weight, particularly of at least 1% by weight. At least 50% and preferably 75–100% of the basic nitrogen radicals of the polymers are in salt form with the above sulfosuccinates.

Salts of a metal having an atomic number of 22–28 and an alkylated salicylic acid are used for increasing the electrical conductivity of the hydrocarbons; of these salts, those of trivalent metals are specially preferred, and of these chromium in particular. The alkylated salicylic acid should contain at least one alkyl substituent having 8–24, the number of carbon atoms in the alkyl substituent is preferably between 10 and 22, for example between 14 and 18. Other substituents may be present in addition to this alkyl substituent. Chromium alkyl salicylates of trivalent chromium are effective for increasing the electrical conductivity of, for example, hydrocarbons. These chromium salts may be neutral or basic salts. They may be used in the pure state or they may contain contaminations such as phenols and phenates as a result of their preparation.

Typical metallic salts which may be employed include:

Chromium ($C_{14-18}$) alkyl salicylates
Titanium ($C_{12-16}$) alkyl salicylates
Vanadium dodecyl salicylates
Cobalt ($C_{14-16}$) alkyl salicylates An unexpected synergism is experienced by combining alkaline earth metal salts of the above-defined class of sulphodicarboxylates, the proportion of such salts being in the order of about 1–10 parts of alkaline earth metal salt for each part by weight of the polymeric salts. Specific compounds which may be utilized for this purpose include calcium dioctyl sulphosuccinate, calcium didecyl sulphosuccinate, magnesium didodecyl sulphosuccinate, magnesium didecyl sulphoadiphate, and calcium dioctyl sulphosebacate.

In many cases it is desirable to employ the above-described metal salts of the alkylated salicylic acids along with other compounds which synergistically increase the favorable effect of these metal salts on the electrical conductivity. The alkaline earth metal salts of sulphosuccinic acid dioctyl ester and sulphosuccinic acid didecyl ester, particularly the calcium salts, are especially suitable for use in combination with the metal salts according to the invention. These salts of sulphosuccinic acid dioctylester and sulphosuccinic didecyl ester may be employed in quantities in the range of from approximately $1 \times 10^{-9}$ to approximately $1 \times 10^{-4}$ gram atoms of metal per liter, preferably from $1 \times 10^{-7}$ to $1 \times 10^{-5}$ gram atoms of metal per liter of the liquid base.

The invention is particularly applicable to liquid substantially saturated hydrocarbons in the gasoline and kerosene boiling ranges. It is of very great importance in connection with hydrocarbons containing not more than about 15, in particular not more than 12 carbon atoms in the molecule, or liquid mixtures of hydrocarbons containing an average of not more than about 15 carbon atoms in the molecule. Examples of hydrocarbons to which the invention is applicable are aliphatic hydrocarbons or mixtures thereof, such as hexane, heptane cyclic aliphatic hydrocarbons, such as decalin, mixtures of various aliphatic, and cyclic aliphatic hydrocarbons.

The invention may be particularly applied to light petroleum fractions boiling in the gasoline and kerosene boiling ranges, between about 75° C. and about 300° C., for example, fuels for spark-ignition internal combustion engines and fuels for gas turbines used for the propulsion of aircraft.

In addition to the salts according to the invention, other compounds may be added to the organic liquids, for example metal deactivators, such as the salicylidene imines and the N,N'-disalicylidene diimines, of which N,N'-disalicylidene-1,2'-propane diamine is an example. Further, compounds stabilising the electrical conductivity of the organic liquids against degrading during storage and contact of the organic liquid with water and caustic may be added. Examples of such compounds are polymers or copolymers with one or more acid groups or anhydrides or salts thereof, such as a copolymer of methacrylic acid and stearyl methacrylate; nitrogen-containing copolymers, such as copolymers of N-substituted amides of unsaturated carboxylic acids, such as polymers of N'-1,1,3,3-tetramethyl butyl methacrylamide.

In the following examples, salts of the polymers and copolymers A–W were used, which salts had been derived from one of the sulpho succinic acid esters I–VIII.

A. Polymer of ethylene imine, commercially available as an aqueous solution and having a molecular weight of 10,000,000.

B. Polymer mentioned under A treated with benzyl chloride.
C. Polymer of 2-methyl-5-vinyl pyridine.
D. Polymer mentioned under C treated with benzyl chloride.
E. Copolymer of 2-methyl-5-vinyl pyridine and a mixture of lauryl methacrylate and stearyl methacrylate, nitrogen content 1.12% by weight, molecular weight 24,000.
F. As E but nitrogen content 1.16% w. and molecular weight 64,000.
G. As E but nitrogen content 1.26% w. and molecular weight 133,000.
H. As E but nitrogen content 1.92% w. and molecular weight 26,000.
I. As E but nitrogen content 2.01% w. and molecular weight 112,000.
J. As E but nitrogen content 2.38% w. and molecular weight 15,300.
K. As E but nitrogen content 2.68% w. and molecular weight 33,000.
L. As E but nitrogen content 2.87% w. and molecular weight 60,000.
M. As E but nitrogen content 2.93% w. and molecular weight 166,000.
N. As E but nitrogen content 2.95% w. and molecular weight 13,000.
O. As E but nitrogen content 2.99% w. and molecular weight 5,000.
P. As E but nitrogen content 3.04% w. and molecular weight 100,000.
Q. As E but nitrogen content 3.05% w. and molecular weight 84,000.
R. As E but nitrogen content 3.98% w. and molecular weight 24,000.
S. As E but nitrogen content 3.98% w. and molecular weight 25,000.
T. As E but nitrogen content 4.06% w. and molecular weight 60,000.
U. As E but nitrogen content 4.31% w. and molecular weight 45,000.
V. As E but nitrogen content 4.45% w. and molecular weight 113,000.
W. Copolymer J treated with benzyl chloride.

I. Sulphosuccinic acid monocyclohexyl ester.
II. Sulphosuccinic acid mono-n.octylester.
III. Sulphosuccinic acid mono-sec.octylester.
IV. Sulphosuccinic acid mono-2-ethyl hexyl ester.
V. Sulphosuccinic acid mono-cetylester.
VI. Sulphosuccinic acid di-n.octylester.
VII. Sulphosuccinic acid di-2-ethyl hexylester.
VIII. Sulphosuccinic acid di-decylester.

The molecular weights of the polymers and copolymers were determined by means of the light-scattering technique.

The following salts were prepared.

1. Salt of polymer A and sulphodicarboxylic acid ester VIII.
2. Salt of polymer B and sulphodicarboxylic acid ester VIII.
3. Salt of polymer C and sulphodicarboxylic acid ester VIII.
4. Salt of polymer D and sulphodicarboxylic acid ester VIII.
5. Salt of copolymer E and sulphodicarboxylic acid ester VIII.
6. Salt of copolymer F and sulphodicarboxylic acid ester VIII.
7. Salt of copolymer G and sulphodicarboxylic acid ester VIII.
8. Salt of copolymer H and sulphodicarboxylic acid ester VIII.
9. Salt of copolymer I and sulphodicarboxylic acid ester VIII.
10. Salt of copolymer J and sulphodicarboxylic acid ester VIII.
11. Salt of copolymer K and sulphodicarboxylic acid ester VIII.
12. Salt of copolymer L and sulphodicarboxylic acid ester V.
13. Salt of copolymer L and sulphodicarboxylic acid ester VII.
14. Salt of copolymer L and sulphodicarboxylic acid ester VIII.
15. Salt of copolymer M and sulphodicarboxylic acid ester VIII.
16. Salt of copolymer N and sulphodicarboxylic acid ester VIII.
17. Salt of copolymer O and sulphodicarboxylic acid ester VIII.
18. Salt of copolymer P and sulphodicarboxylic acid ester VIII.
19. Salt of copolymer Q and sulphodicarboxylic acid ester I.
20. Salt of copolymer Q and sulphodicarboxylic acid ester II.
21. Salt of copolymer Q and sulphodicarboxylic acid ester III.
22. Salt of copolymer Q and sulphodicarboxylic acid ester IV.
23. Salt of copolymer Q and sulphodicarboxylic acid ester V.
24. Salt of copolymer Q and sulphodicarboxylic acid ester VI.
25. Salt of copolymer Q and sulphodicarboxylic acid ester VII.
26. Salt of copolymer Q and sulphodicarboxylic acid ester VIII.
27. Salt of copolymer R and sulphodicarboxylic acid ester VIII.
28. Salt of copolymer S and sulphodicarboxylic acid ester VIII.
29. Salt of copolymer T and sulphodicarboxylic acid ester VIII.
30. Salt of copolymer U and sulphodicarboxylic acid ester VIII.
31. Salt of copolymer V and sulphodicarboxylic acid ester VIII.
32. Salt of copolymer W and sulphodicarboxylic acid ester VIII.

The copolymers were prepared by copolymerization of the monomers in xylene, using benzoyl peroxide as initiator. In all copolymers the molar ratio of the monomers lauryl methacrylate and stearyl methacrylate is 2:1, the quantity of 2-methyl-5-vinyl pyridine present in the copolymers is shown by the nitrogen content stated. During copolymerization varying quantities of amyl mercaptan or dodecyl mercaptan were added, so that copolymers with varying molecular weights were obtained.

PREPARATION OF THE SALTS OF POLYMERS OR COPOLYMERS CONTAINING BASIC NITROGEN

Preparation of salt No. 1

423 parts by weight of an aqueous solution of polyethylene imine, which solution contained 47% by weight of polyethylene imine and per part by weight 0.21 milliequivalents of basic nitrogen, were diluted with 700 parts by weight of methanol. To this solution were added 3500 parts by weight of a solution of the ammonium salt of sulphosuccinic acid didecyl ester in gasoline 80/110, which solution contained 0.551 milliequivalents of the salt per part by weight. The mixture was brought to the boil and methanol and water were removed by azeotropic distillation. The resultant ammonia also passed over in the distillate. Gasoline was then distilled off until the distillate residue was 2,248 parts by weight. This residue contained 1,124 parts by weight of the salt of polyethylene imine and sulphosuccinic acid didecyl ester.

Preparation of salt No. 2

100 parts by weight of an aqueous solution of polyethylene imine containing 50% by weight of polyethylene imine and per gram 5 milliequivalents of hydrochloric acid titratable nitrogen were dissolved in a mixture of 600 parts by weight of isopropyl alcohol and 500 parts by weight of benzene. To remove the water present this solution was distilled until the distillate residue was 150 parts by weight. 70 parts by weight of benzyl chloride were added to this residue and the mixture heated at 70–80° C. for two hours while stirring continually. After cooling to room temperature, 150 parts by weight of methanol were added and the resultant solution poured out in 800 parts by weight of ether. The product which separated was air-dried. 120 parts by weight of benzylated product were obtained having a chlorine content of 4.35 milliequivalents per gram as determined by titration with silver nitrate solution.

110 parts by weight of the ammonium salt of sulphosuccinic acid didecyl ester dissolved in 200 parts by weight of methanol were added to 50 parts by weight of the benzylated product dissolved in 200 parts by weight of methanol. The mixture was distilled until 300 parts by weight of methanol passed over, 200 parts by weight of benzene were then added and distillation continued until the mixture distilled was free from methanol, the volume of the said mixture being kept approximately constant by the continuous addition of benzene. After cooling the precipitated ammonium chloride was removed from the distillate residue by filtration; 148 parts by weight of the salt number 2 were obtained by freeze-drying.

Preparation of salt No. 3

11.9 parts by weight of poly(2-methyl-5-vinyl pyridine) were dissolved in 40 parts by weight of methanol. A solution of 49.5 parts by weight of the ammonium salt of sulphosuccinic acid didecyl ester in 50 parts by weight of methanol was added to the resultant solution. 10 parts by weight of hydrochloric acid, specific gravity 1.19, were added to the mixture of the above two solutions and the mixture heated at 70° C. for one hour while stirring. Methanol was then distilled off and benzene added simultaneously, so that the volume of the mixture distilled remained constant. After cooling the resultant ammonium chloride was filtered off and the filtrate concentrated by distillation to 140 parts by weight; the resultant concentrate contained 45% by weight of salt number 3.

Preparation of salt No. 4

35 parts by weight of the poly(2-methyl-5-vinyl pyridine) used as starting product for the preparation of salt No. 3 were dissolved in 50 parts by weight of xylene. 20 parts by weight of benzyl chloride were added to this solution and the mixture subsequently heated in a bath of 100° C. for 1½ hours while stirring. The reaction product separated as a solid in the solvent. The separated product again went into solution by adding 100 parts by weight of methanol to the cooled mixture. This solution was poured out in 400 parts by weight of ether. The precipitated product was dissolved in 50 parts by weight of methanol and again precipitated by adding the methanolic solution to 400 parts by weight of ether. The resultant precipitate was air-dried. 50 parts by weight of dry product were obtained; the chlorine content could be determined by dissolving in water and titrating with aqueous silver nitrate. This was 2.64-milliequivalents per gram.

A solution of 49.5 parts by weight of the ammonium salt of sulphosuccinic acid didecyl ester in 90 parts by weight of methanol was added to 40 parts by weight of the benzylated product dissolved in 90 parts by weight of methanol. 150 parts by weight of methanol were removed by distillation and the remaining quantity of methanol was subsequently distilled off while the volume of the mixture being distilled was kept constant by the addition of benzene. After removal of the resultant ammonium chloride by filtration, the filtrate was brought up to a quantity of 190 parts by weight by distillation. The content of salt No. 4 was 48% by weight.

Preparation of salts No. 5–No. 31

The salts were prepared according to the following method:

To a solution of the polymer was added a solution of the sodium or ammonium salt of the sulphosuccinic acid ester in a quantity equivalent to the polymer or copolymer, based on the nitrogen content thereof. An equivalent quantity of hydrochloric acid, based on the nitrogen content, was then added. The resultant sodium or ammonium chloride was subsequently removed by washing with water or by filtration. As an example of this method of preparation the preparation of salt number 26 is described below.

Preparation of salt No. 26

Polymer Q was used as starting material. 640 parts by weight of this polymer were dissolved in 1,000 parts by weight of gasoline 80/110. 1,413 parts by weight of a 50% by weight solution of the sodium salt of sulphosuccinic acid didecyl ester in 3:1 water isopropanol mixture were diluted with 250 parts by weight of methanol. This methanol-diluted solution was added to the solution of the copolymer in gasoline 80/110, after which the resultant mixture brought to a temperature of 50° C. 252 parts by weight of 22% by weight of hydrochloric acid were then added while stirring and stirring subsequently continued for another hour at a temperature of 70° C. The mixture was cooled to room temperature after which the bottom layer consisting of a water-alcohol mixture was removed. The top layer was washed with 500 parts by weight of water by stirring this layer for 15 minutes at 70° C. and then removing the water layer (bottom layer). This washing with 500 parts by weight of water was repeated once. The residual water still present in the solution was then removed by azeotropic distillation. 2,630 parts by weight of dry solution were obtained containing 50° by weight of salt number 26.

Preparation of salt No. 32

10 parts by weight of benzyl chloride (i.e., 40% excess) were added to 60 parts by weight of copolymer J solution which contained 54.7% by weight of copolymer. The mixture was boiled under reflux for three hours. Benzene and most of the excess benzyl chloride were then removed in vacuo, after which the residue was taken up in 50 parts by weight of benzene. The benzylated copolymer was isolated from this solution by freeze drying. The yield was 40 parts by weight the content of titratable chlorine was 1.40 milliequivalents per gram.

25 parts by weight of benzylated copolymer were dissolved in 100 parts by weight of benzene. To this solution was added a solution of 18 parts by weight of ammonium salt of sulphosuccinic acid didecyl ester in 100 parts by weight of benzene. The mixture was heated to 70–80° C. for one hour while stirring. The resultant ammonium chloride was then filtered off and the salt number 32 recovered from the filtrate by freeze drying. The yield was 41 parts by weight.

EXAMPLES

In the following examples the conductivities are measured by the cell-method described on page 87 of A. Klinkenberg and J. L. van der Minne's "Electrostatics in the Petroleum Industry," Elsevier Publishing Company (1958), and expressed in units of picomho/m. or $1 \times 10^{-14}$ ohm$^{-1}$ cm.$^{-1}$. The influence of silica gel treatment of kerosene and gasoline on the conductivity is shown by the following:

The electrical conductivities of solutions of conductivity increasing salts in kerosene and gasoline were measured.

The kerosenes and gasoline used for this purpose were:

Kerosene A. refined aviation kerosene having a boiling range from 150°–250° C., obtained by refining a Middle-East crude.

Kerosene B: refined aviation kerosene having a boiling range of from 174°–270° C., obtained by refining a North American crude.

Gasoline: initial boiling point 80° C., final boiling point 110° C. A 2.1% by weight of chromium containing solution in xylene of a $C_{14-18}$ alkyl salicylic acid was added to the Kerosenes A and B and to the gasoline in such a quantity that the chromium content in the kerosene and in the gasoline was $4 \times 10^{-7}$ gram atoms per liter; a 2.0% by weight of calcium-containing solution of xylene of the calcium salt of sulphosuccinic acid didecyl ester was also added in such a quantity that the calcium content amount to $5 \times 10^{-7}$ gram atoms per liter. The conductivity of these solutions was measured.

Kerosene A was filtered over silica gel, the quantity of silica gel being 2% by weight, based on the filtered quantity of kerosene. This silica gel treatment was also carried out with Kerosene B and with the gasoline.

To these kerosenes and gasoline filtered over silica gel the above chromium salt was added until the content was $4 \times 10^{-7}$ gram atoms of chlorine per liter, and the above calcium salt was also added until the concentration was $5 \times 10^{-7}$ gram-atom of calcium per liter, the conductivity then being measured.

The results of the above measurings are given in Table I.

TABLE 1

| Hydrocarbon Fraction | Additive | Conductivity, picomho/m. |
|---|---|---|
| Kerosene A | Cr-salicylate / Ca-sulphosuccinate | 1,400 |
| Kerosene A filtered over silica gel | Cr-salicylate / Ca-sulphosuccinate | 3,500 |
| Kerosene B | Cr-salicylate / Ca-sulphosuccinate | 780 |
| Kerosene B filtered over silica gel | Cr-salicylate / Ca-sulphosuccinate | 2,280 |
| Gasoline 80/110 | Cr-salicylate / Ca-sulphosuccinate | 3,000 |
| Gasoline 80/110 filtered over silica gel. | Cr-salicylate / Ca-sulphosuccinate | 8,000 |

EXAMPLE I

To the above-mentioned Kerosene A which was not treated with silica gel the 2.1% by weight of chromium-containing solution in xylene of $C_{14-18}$ alkyl phenol-containing salt of trivalent chromium and $C_{14-18}$ alkyl salicylic acid in xylene was added in such a quantity that the chromium content in the kerosene was $4 \times 10^{-7}$ gram atoms per liter, the 2.0% by weight of calcium-containing solution in xylene of the calcium salt of sulphosuccinic acid didecyl ester also being added in a concentration of $5 \times 10^{-7}$ gram atoms of calcium per liter as well as a salt according to the invention in a quantity of 0.0002% by weight, based on the chromium-containing solution. The conductivety of this solution was measured.

The results of these conductivity measurements are given in Table II.

TABLE II

[Conductivity of solutions of Kerosene A]

Salt according to the invention:      Conductivity in picomho/m.
- No. 1 _____ 2730
- No. 2 _____ 3300
- No. 3 _____ 2830
- No. 4 _____ 2730
- No. 5 _____ 2650
- No. 6 _____ 2900
- No. 7 _____ 2750
- No. 8 _____ 3700
- No. 9 _____ 3200
- No. 10 _____ 3500
- No. 11 _____ 3550
- No. 12 _____ 2700
- No. 13 _____ 3550
- No. 14 _____ 3170
- No. 15 _____ 3500
- No. 16 _____ 3050
- No. 17 _____ 2900
- No. 18 _____ 3500
- No. 19 _____ 2900
- No. 20 _____ 3300
- No. 21 _____ 3170
- No. 22 _____ 3070
- No. 23 _____ 2900
- No. 24 _____ 3650
- No. 25 _____ 3650
- No. 26 _____ 3400
- No. 27 _____ 3850
- No. 28 _____ 3050
- No. 29 _____ 3650
- No. 30 _____ 4000
- No. 31 _____ 3650
- No. 32 _____ 1870

EXAMPLE II

Conductivity measurements similar to those described in Example I were made with the above mentioned Kerosene B; the same concentrations of conductivity-increasing materials and salts according to the invention were used. The results of these measurements are given in Table III.

TABLE III

[Conductivity of solutions of Kerosene B]

Salt according to the invention:      Conductivity in picomho/m.
- No. 1 _____ 1780
- No. 26 _____ 2150

EXAMPLE III

Measurements were made similar to those described in Examples I and II, using the same concentrations of the additives chromium salicylate and calcium sulphosuccinate and of the salts according to the invention with the above-mentioned gasoline 80/110. The results of the measurements are given in the following Table IV.

TABLE IV

[Conductivity of solutions of gasoline 80/110]

Salt according to the invention:      Conductivity in picomho/m.
- No. 1 _____ 7160
- No. 3 _____ 7160
- No. 26 _____ 7230

We claim as our invention:

1. A conductivity composition consisting essentially of 1–10 parts by weight each of (1) a salt of the polyvalent metal having an atomic number of 22–88 and a $C_{8-24}$ alkyl salicylic acid (2) a salt of a diester of a $C_{6-18}$ aliphatic monohydric alcohol and a $C_{4-10}$ aliphatic sulfocarboxylic acid with a basic nitrogen-containing polymer of the group consisting of the poly ($C_{2-5}$ alkylene imines), poly (vinyl pyridines), poly (esters of amino alchohols and an acrylic acid) and copolymers of vinyl pyridines with an acrylic acid ester of at least one $C_{10-24}$ aliphatic monohydric alcohol, at least 50% of the basic nitrogen radicals of the polymers being in salt form with the ester of sulfodicarboxylic acid.

2. A hydrocarbon fuel composition consisting essentially of a predominating amount of substantially saturated hydrocarbons in the gasoline and kerosene boiling range between about 75° C. and about 300° C. and 0.25–10 p.p.m. of a conductivity composition according to claim 1.

3. A conductivity composition according to claim 1 and in addition thereto 1–10 parts by weight of alkaline earth metal salt of diesters of $C_{6-18}$ aliphatic monohydric alcohols and $C_{4-10}$ aliphatic sulfodicarboxylic acids.

4. A hydrocarbon fuel composition consisting essentially of a predominating amount of substantially saturated hydrocarbons in the gasoline and kerosene boiling range between about 75° C. and about 300° C. and 0.25–10 p.p.m. of a conductivity composition according to claim 3.

5. A conductivity composition consisting essentially of 1–10 parts by weight each of (1) a salt of a polyvalent metal having an atomic number of 22–28 and a $C_{8-24}$ alkyl salicylic acid (2) a salt of a $C_{8-18}$ dialkyl ester of sulfosuccinic acid and copolymers of a vinyl pyridine with acrylic acid esters of $C_{10-24}$ aliphatic alcohols, said copolymers having a vinyl pyridine content of 5–40% by weight, at least about 50% of the nitrogen radicals of the copolymer being in salt form with the ester of sulfosuccinic acid.

6. A conductivity composition consisting essentially of 1–10 parts by weight each of (1) a salt of a polyvalent metal having an atomic number of 22–28 and a $C_{8-24}$ alkyl salicylic acid (2) a salt of a $C_{8-18}$ dialkyl ester of sulfosuccinic acid and a poly ($C_{2-5}$ alkylene imine) at least 50% of the basic nitrogen radicals of the polymer being in salt form with the ester of sulfosuccinic acid.

7. A conductivity composition consisting essentially of 1–10 parts by weight each of (1) a salt of a polyvalent metal having an atomic number of 22–28 and a $C_{8-24}$ alkyl salicylic acid (2) a salt of a $C_{8-18}$ dialkyl ester of sulfosuccinic acid and poly (vinyl pyridines) at least 50% of the basic nitrogen radicals of the polymer being in salt form with the ester of sulfosuccinic acid.

8. A conductivity composition consisting essentially of 1–10 parts by weight each of:
  (1) A chromium salt of $C_{14-18}$ alkyl salicylic acid;
  (2) A calcium didecyl sulfosuccinate; and
  (3) A salt of the didecyl ester of sulfosuccinate acid and at least 50% of the basic nitrogen radicals of a copolymer of lauryl methacrylate, stearyl methacrylate and 2-methyl-5-vinyl pyridine, said copolymer having a vinyl pyridine content of 20–30% by weight and an average molecular weight of 15,000–250,000.

9. A hydrocarbon fuel composition consisting essentially of a predominating amount of substantially saturated hydrocarbons in the gasoline and kerosene boiling range between about 75° C. and about 300° C. and 0.25–10 p.p.m. of a conductivity composition according to claim 8.

References Cited by the Examiner

UNITED STATES PATENTS

| | | | |
|---|---|---|---|
| 2,028,091 | 1/36 | Jaeger | 252—33 X |
| 2,445,799 | 7/48 | Morris | 260—79.3 |
| 2,717,887 | 9/55 | Saner | 260—79.3 |
| 2,798,044 | 7/57 | Vitalis | 252—8.7 |
| 2,888,340 | 5/59 | Wennick | 44—62 |
| 3,012,969 | 12/61 | Van der Minne et al. | 44—68 X |
| 3,013,868 | 12/61 | Skei et al. | 44—62 |

FOREIGN PATENTS 540,832   5/57   Canada.

DANIEL E. WYMAN, *Primary Examiner.*

JULIUS GREENWALD, *Examiner.*